United States Patent [19]

Ray

[11] Patent Number: 5,609,942
[45] Date of Patent: Mar. 11, 1997

[54] PANEL HAVING CROSS-CORRUGATED SANDWICH CONSTRUCTION

[75] Inventor: Hemen Ray, Perkasie, Pa.

[73] Assignee: The United States of America as represented by the Secretary of the Navy, Washington, D.C.

[21] Appl. No.: 403,029

[22] Filed: Mar. 13, 1995

[51] Int. Cl.⁶ .................................. B32B 3/28; B31F 1/20
[52] U.S. Cl. .......................... 428/182; 428/116; 428/184; 428/185; 52/783.11; 52/783.18; 156/205; 156/210; 156/292; 264/286
[58] Field of Search .................................. 428/182, 184, 428/105, 114, 116, 185; 52/783.11, 783.18; 156/205, 155, 210, 292; 264/505, 313, 257, DIG. 44, 286

[56] References Cited

U.S. PATENT DOCUMENTS

| 5,128,195 | 7/1992 | Hegedus | 428/174 |
| 5,162,143 | 11/1992 | Porter et al. | 428/179 |
| 5,348,601 | 9/1994 | Ray | 156/155 |

Primary Examiner—Donald Loney
Attorney, Agent, or Firm—Susan E. Verona; Ron Billi

[57] ABSTRACT

A cross-corrugated panel has a core between two faceplates, where the core comprises two groups of corrugated elements that are perpendicular to each other. The corrugated elements have peaks and troughs connected by diagonally-extending segments. In each group of corrugated elements the peaks and troughs in adjacent elements are 180 degrees out-of-phase with each other. The faceplates and the corrugated elements in each group are joined at the peaks and troughs. The diagonally-extending segments of one of the elements comprise flat strips whose flat surfaces are parallel to each other and perpendicular to the faceplates. To make a cross-corrugated panel, a first group of elements is provided, each element being formed by oppositely winding two strips of curable material to form overlapping helixes having rectangular cross-sections. The elements are positioned in parallel. A second group of elements of curable material is placed perpendicular to the first group of elements. Each such element is positioned alternately over and under adjacent elements of the first group to form peaks and troughs. The peaks and troughs of adjacent elements are 180 degrees out-of-phase with each other. Mandrels and inserts are used to form the elements in each of the groups. The elements are then disposed between two faceplates of curable material to form an assembly. The mandrels and inserts are replaced by granular particles and the assembly is cured.

12 Claims, 4 Drawing Sheets

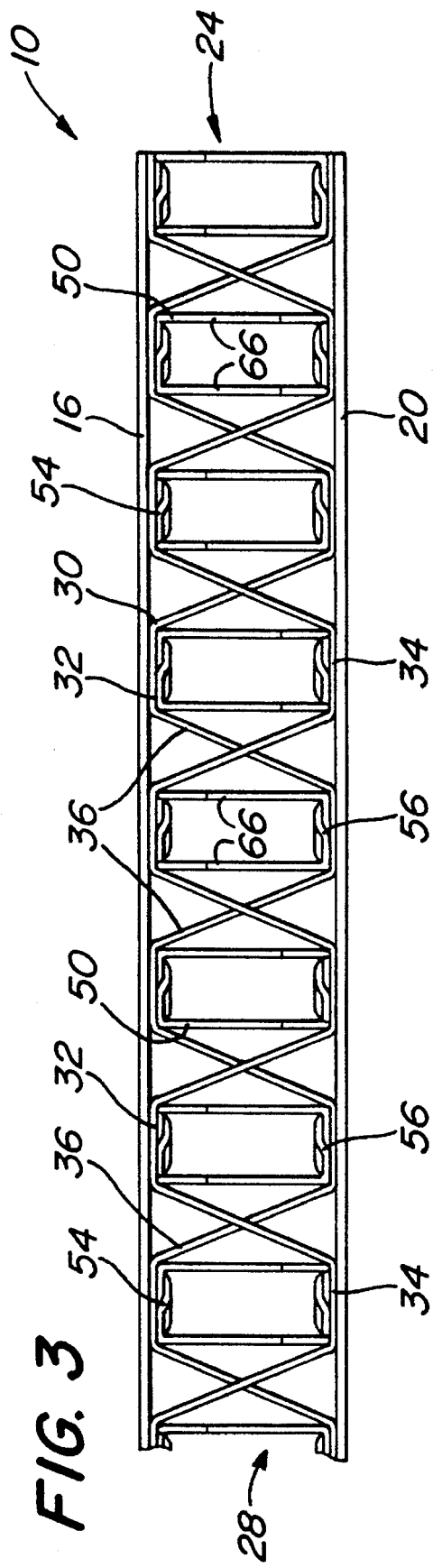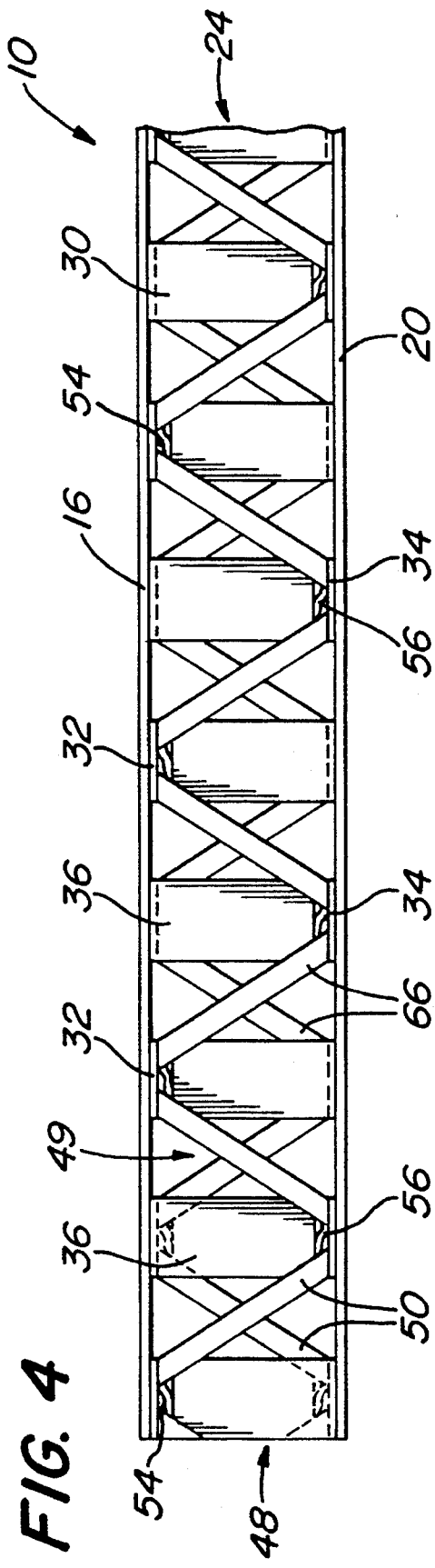

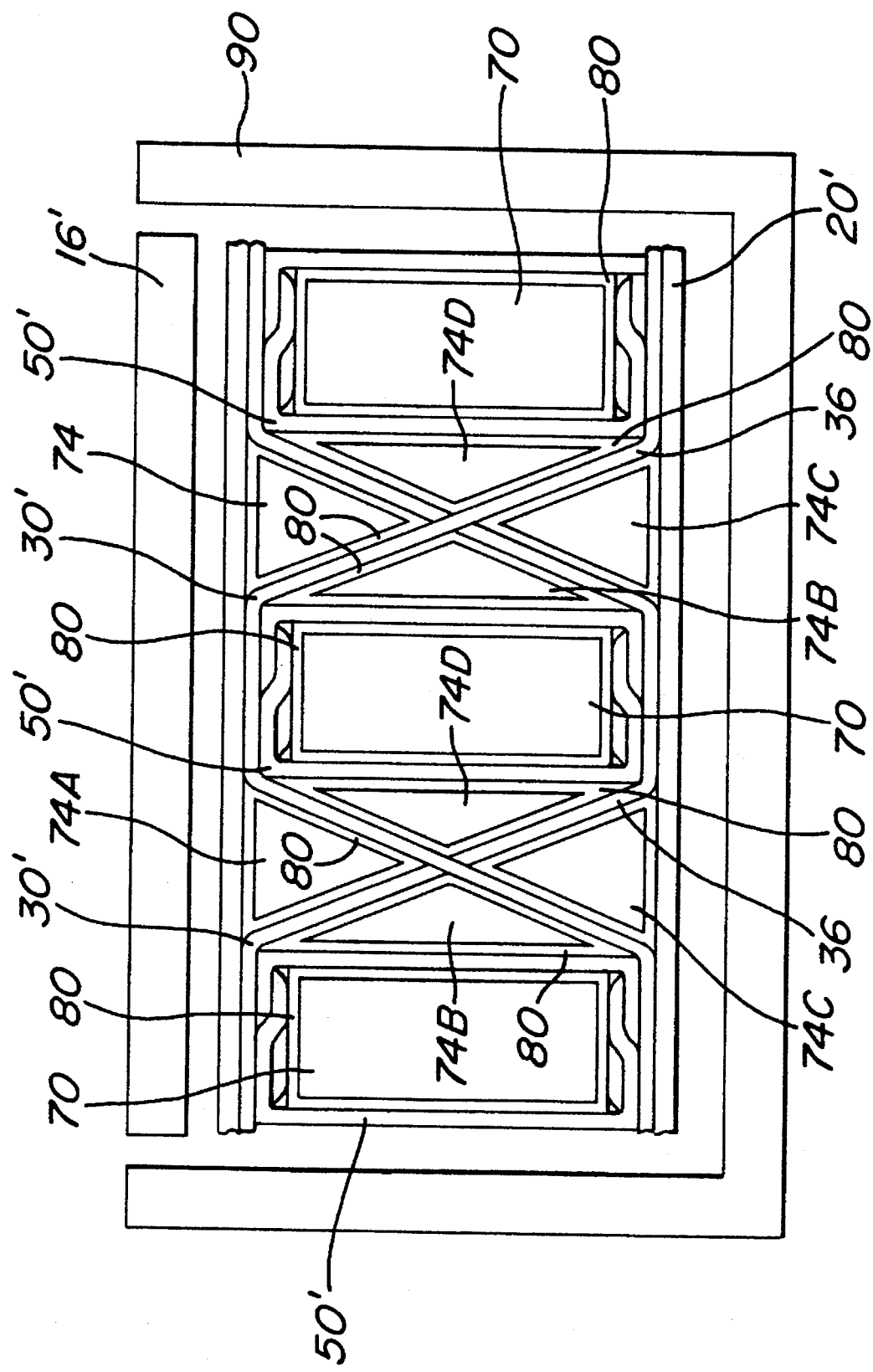

PANEL HAVING CROSS-CORRUGATED SANDWICH CONSTRUCTION

The invention described herein may be manufactured and used by or for the Government of the United States of America for governmental purposes without the payment of any royalties thereon or therefor.

FIELD OF THE INVENTION

The present invention relates to improvements in corrugated panels, sometimes referred to as "sandwich panels." More particularly, the invention relates to a self-venting corrugated panel having a core comprising mutually perpendicular corrugated elements for providing improved strength, i.e., resistance to compressive, bending and shearing forces. The invention further relates to a method for producing such panels.

BACKGROUND OF THE INVENTION

Light-weight sandwich panel construction employing a honeycomb core sandwiched between faceplates has been highly useful for various aerospace applications such as the manufacture of space vehicle and satellite components. However, the application of such panels to the primary and secondary structures of ground-based airplanes and helicopters has resulted in significant maintenance problems. For example, during the past twenty years of service experience, very high frequency of repair has been reported, due, for example, to problems with moisture retention, corrosion, ineffective edge seals and unbonding of the faceplates from the cores. Moreover, during repair work, further unbonding of the faceplates from the core can result from high vapor pressure produced by the heating process used to cure the repair material. Thus, any comparable substitute to a honeycomb sandwich construction that eliminates or reduces the moisture retention and unbondings problem would be beneficial.

In U.S. Pat. No. 5,348,601 issued to Hemen Ray on Sep. 20, 1994, there is disclosed a low-density sandwich construction with an open core that makes it self-venting. It comprises corrugated strips having planar peaks and troughs, arranged adjacent to and parallel with each other, with the peaks and troughs of adjacent strips being 180 degrees out-of-phase with each other. This creates a plurality of passage-ways through which moisture can escape. Such a construction has good bending strength in the direction perpendicular to the corrugated strips, but less bending strength in the transverse direction.

In U.S. Pat. No. 5,162,143 issued to Porter on Nov. 10, 1992, there is disclosed a sandwich construction having a core which is made up of a plurality of criss-crossed corrugated strips. The corrugated strips cross at their peaks and troughs. To manufacture the construction, forming protrusions are positioned on a base, and the corrugated strips are placed over the protrusions to form the peaks of the corrugations. One protrusion is required for each peak crossing point. The criss-crossed strips are then cured to form the core of the sandwich construction. The forming protrusions are then removed, and face sheets are adhesively bonded to the core. This construction thus does not overcome the face sheet unbonding problem from which sandwich constructions suffer.

SUMMARY OF THE INVENTION

In view of the foregoing discussion, an object of this invention is to provide an improved self-venting cross-corrugated panel which is substantially stiffer than similarly-constructed corrugated panels of the prior art and which is bending- and shear-resistant in two directions.

Another object of this invention is to provide a method for manufacturing the cross-corrugated panel of the invention which reduces the unbonding problem common to other sandwich structures.

These and other objects are accomplished by a cross-corrugated panel comprising first and second faceplates positioned essentially parallel to and spaced apart from each other and first and second pluralities of corrugated elements fixed between the faceplates. The corrugated elements of each plurality have planar peaks and troughs positioned at regular intervals and connected by diagonally-extending segments. All of the corrugated elements in a group are positioned parallel to and spaced apart from each other with the peaks and troughs being 180 degrees out-of-phase with each other such that the peaks of one element are adjacent to the troughs of adjacent elements. The two pluralities of elements are positioned perpendicular to each other, the elements of one plurality crossing the elements of the other plurality at their respective planar peaks and troughs. The diagonally-extending segments of the first plurality of elements comprise two flat strips whose flat surfaces are parallel to each other and perpendicular to the faceplates.

The preferred manufacturing method comprises providing a pair of spaced faceplates and two groups of elements, all of curable material. In the first group of elements, each element comprises two strips that are oppositely wound to define two elongated helixes having a rectangular cross-section and intersecting each other on the short sides of the rectangular cross-section. The elements of the first group are arranged in parallel relation to each other. The second group of elements, each of which is a strip, is positioned perpendicular to the elements of the first group. Each strip is positioned alternately over and under adjacent ones of the elements of the first group so that adjacent strips contact the elements of the first group where the helixes thereof intersect, so that adjacent strips are 180 degrees out-of phase with each other. The elements form a core, which is placed between the faceplates to form an assembly. The assembly is heated and cured to create a rigid strong panel construction.

The invention and its various advantages can be better understood from the ensuing detailed description of preferred embodiments, reference being made to the accompanying drawings.

BRIEF DESCRIPTION OF THE DRAWINGS

FIG. 3 is a side view taken along line III—III of FIG. 1.

FIG. 4 is a side view taken along line IV—IV of FIG. 1.

FIG. 5 is an illustration of an intermediate step in manufacturing the panel shown in FIG. 1.

DETAILED DESCRIPTION OF THE PREFERRED EMBODIMENT

Figure 1:
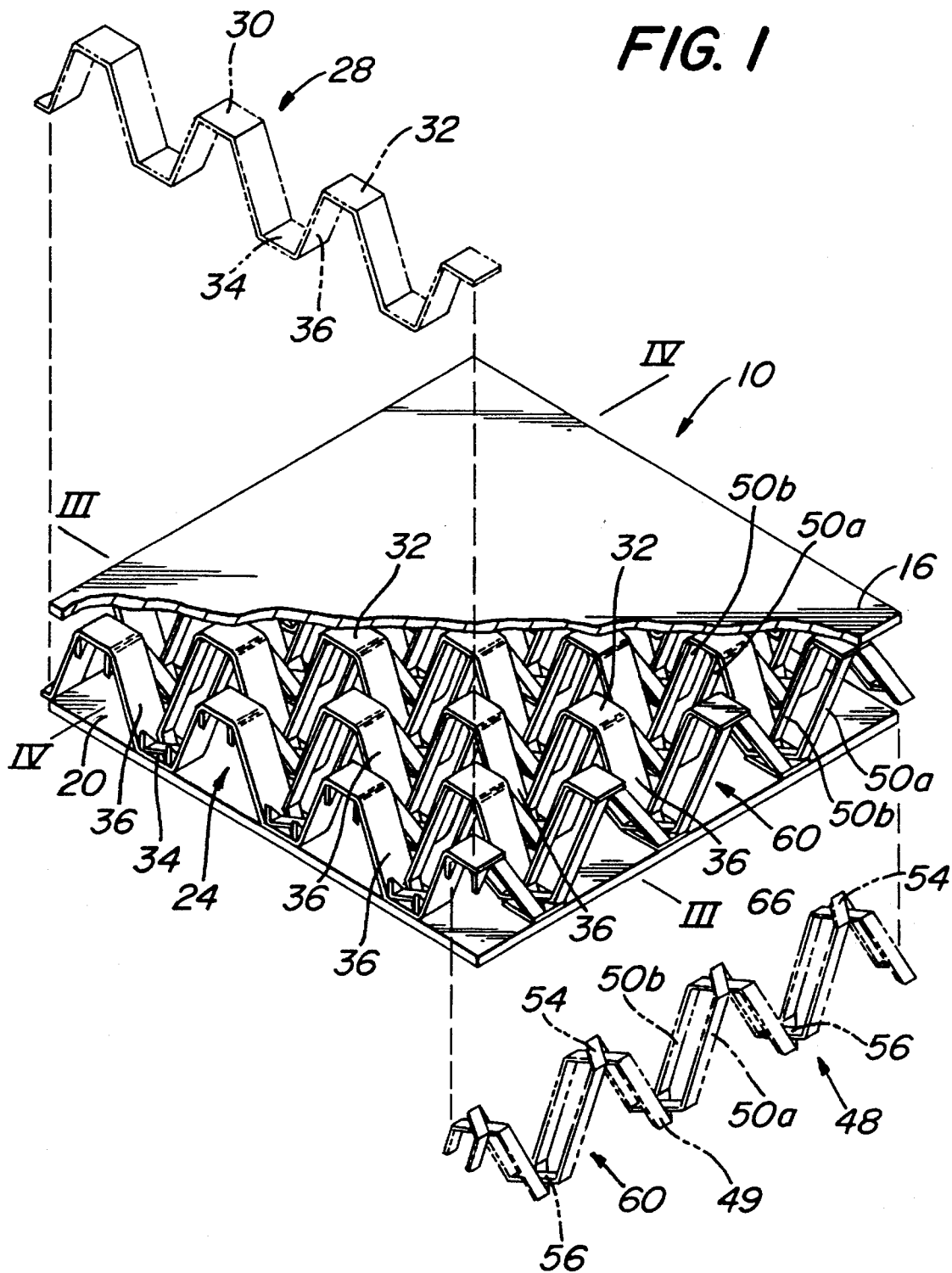
FIG. 1 is an exploded perspective view of a presently preferred embodiment of the cross-corrugated panel of the invention.

Referring again to the drawings, FIG. 1 illustrates the structural details of a cross-corrugated panel 10 according to a presently preferred embodiment of the invention. The cross-corrugated panel 10 comprises a pair of opposing faceplates 16 and 20 and a core 24. While the faceplates are illustrated as comprising parallel flat surfaces, it is within the scope of this invention for the faceplates to be curved.

Figure 2:
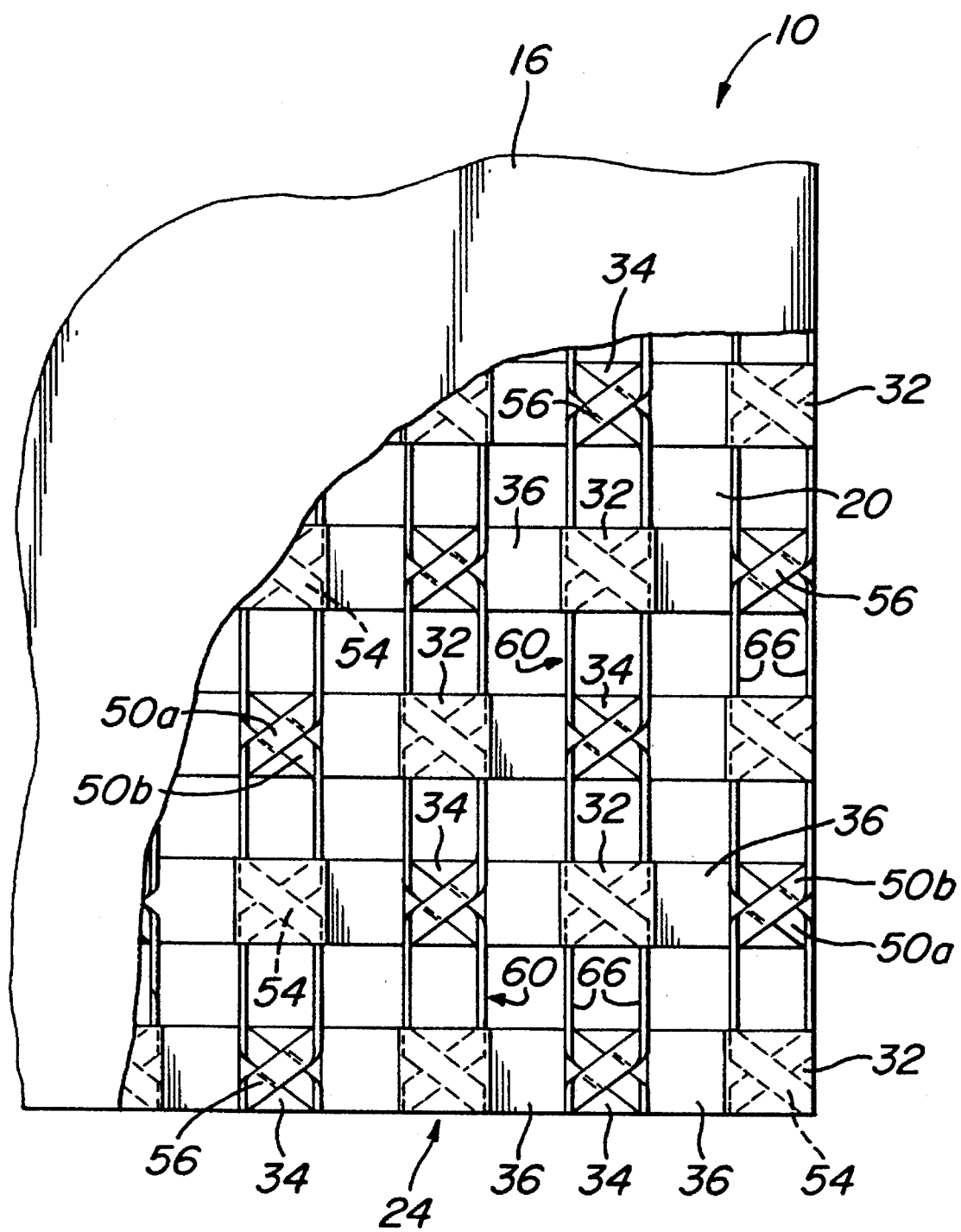
FIG. 2 is a top plan view of the cross-corrugated panel illustrated in FIG. 1 but with one of the faceplates partially removed.

As seen in FIGS. 1, 2 and 3 the core 24 comprises a first group 28 of elements, each element being a corrugated strip 30 having planar peaks 32 and troughs 34 positioned at regular intervals and connected by diagonally-extending segments 36. Peaks 32 and troughs 34 comprise substantially flat surfaces to which the faceplates 16 and 20 are fixed.

Strips 30 of first group 28 are spaced apart and parallel to each other and are arranged so that peaks 32 and troughs 34 of adjacent strips are 180 degrees out-of-phase with each other, so that the peaks of one strip are along side the troughs of its adjacent strip.

Core 24 also includes a second group 48 of elements 49. Each element 49 comprises two strips 50*a* and 50*b*, which together give the element a corrugated pattern having planar peaks 54 and planar troughs 56 that are connected by diagonally-extending segments 60, in a manner similar to strips 30 of first group 28. Elements 49 are arranged so that they are parallel to each other and perpendicular to strips 30 of first group 28.

As seen in FIG. 1, adjacent elements 49 in the second group 48 are 180 degrees out-of-phase with each other so that peaks 54 of one element are adjacent to troughs 56 of its adjacent elements. Furthermore, elements 49 are spaced apart from each other, enabling peaks 32 of first strips 30 to coincide with peaks 54 of second elements 49 and troughs 34 of first strips 30 to coincide with troughs 56 of second elements 49. Further, peaks 32 and 54 are generally the same size so that they can nest, while troughs 34 and 56 are similarly sized for the same reason. Strips 30 are fixed to faceplates 16 and 20, while strips 50*a* and 50*b* are fixed at peaks 54 and troughs 56 to each other and to peaks 32 and troughs 34 of strips 30.

In FIGS. 1, 2 and 3, the diagonally-extending segments 60 of the second group 48 of elements 49 are seen to each comprise two relatively flat elongated portions 66 whose flat surfaces are parallel to each other and perpendicular to faceplates 16 and 20.

As seen in FIGS. 1 and 2, each of the groups of elements 28 and 48 resist shearing forces in the direction parallel to the faceplates 16 and 20 because the forces are resisted by the diagonally-extending segments 36 and 60. Because the peaks 32 and 54 and troughs 34 and 56 are connected to each other, each of the peaks and troughs forms part of a rigid four-sided pyramid that is capable of resisting shearing forces in all directions. Further, panel 10 is better able to resist compressive forces because each of peaks 32 and 54 and troughs 34 and 56 is supported by four diagonally-extending members 36 and 60.

Still further, the panel 10 can be of any convenient cross-section such as arcuate or angled, provided the diagonally-extending segments 36 and 60 are properly sized.

All of the components of cross-corrugated panel 10 are heat curable. The preferred method for manufacturing panel 10 comprises assembling the components in a mold, heating them until they are cured and bonded to each other, and then removing them from the mold.

Advantageously, the method uses a plurality of elongated mandrels 70 that are rectangular in cross-section and a plurality of groups 74 of elongated inserts 74A, 74B, 74C and 74D that are triangular in cross-section.

As best seen in FIG. 5, each of rectangular mandrels 70 and each of inserts 74A, 74B, 74C and 74D are first wrapped in a thin stretchable release film 80. Examples of suitable release films are A4000, WRIGHTLON 4500 (a halohydrocarbon release film), WRIGHTLON 4600, WRIGHTLEASE 5900 (a high-temperature fluorocarbon film) and THERMALIMIDE RCBS (a polyimide film) films sold by Airtech International Inc., of Carson, Calif.

The second group 48 of elements 49 is formed by wrapping each of rectangular mandrels 70 along its length with two oppositely wound strips 50*a*' and 50*b*' of curable material to define two elongated, intersecting or overlapping helixes. Strips or helixes 50*a*' and 50*b*' intersect or overlap at equal intervals along the two short surfaces of mandrels 70. Mandrels 70 are then placed in side-by-side parallel relation with the short surface (where helixes 50*a*' and 50*b*' intersect) positioned on top and bottom. Adjacent mandrels have helixes that are 180° out-of-phase with respect to each other as to the locations of the helix intersections. In other words, the locations where helixes 50*a*' and 50*b*' overlap on the top of one mandrel 70 should be immediately adjacent to the locations where they overlap on the bottom of the next adjacent mandrel.

The first group 28 of strips 30 is formed by strips 30' of curable material about twice the width of strips 50*a*' and 50*b*'. Strips 30' are placed in side by side arrangement, wrapped alternately over and under mandrels 70 to create the corrugated pattern. Adjacent strips 30'0 are oppositely wrapped alternately over and under the mandrels so as to be 180 degrees out-of-phase with each other. All strips 30' should cross over or under a mandrel 70 at the location where helixes 50*a*' and 50*b*' intersect on that mandrel.

Inserts 74A, 74B, 74C and 74D are arranged as illustrated in FIG. 5 so that inserts 74B and 74D lie alongside and between adjacent mandrels 70 while inserts 74A and 74C lie between the inserts 74B and 74D and in facing relation to faceplates 16 and 20.

The facing surfaces of inserts 74 form diagonally directed slots through which the diagonally-extending segments 36 pass. Additionally, it should be appreciated that inserts 74 define spacers which enable the distance between rectangular mandrels 70 to be fixed.

Strips 30' and 50*a*' and 50*b*' can be made from suitable flexible curable material such as MAGNAMITE (registered trademark) Graphite Prepreg Tape AS4/3501-6, made and sold by Hercules Incorporated, Wilmington, Del. Such a tape comprises an amine-cured epoxy resin that is reinforced with unidirectional graphite fibers.

After mandrels 70 and inserts 74 are wrapped with strips 30' and 50*a*' and 50*b*', they are inserted between a pair of uncured composite faceplates 16' and 20' and placed inside a suitable stiff mold cavity 90 with all of its walls, except for the front wall, secured.

Next, mandrels 70 and inserts 74 are carefully removed one at a time, without removing release films 80. The voids resulting from removing mandrels 70 and inserts 74 are filled and compacted with a suitable granular mixture such as a mixture of glass beads and plastic-type powder such as polytetrafluoroethylene (PTFE) to provide an assembly having a plurality of granular mandrels and inserts.

After the granular mandrels and inserts have been formed, the front of cavity 90 is covered with a soft, uncured silicone rubber-type material. Cavity 90 is then closed by the cavity front wall in a well-known manner, and the top of the cavity is preferably unfastened and loosely placed on the assembly. Finally, the entire assembly is subjected to the curing conditions recommended by the manufacturer of the composite material.

During curing strips 30' and 50a' and 50b' will harden into corrugated semi-rigid strips 30 and 50a and 50b and they will be integrally bonded to each other and to faceplates 16 and 20 at their peaks and troughs 32, 34, 54, and 56.

Upon completion of the cure cycle, the cavity walls are removed and the granular mixture is removed. Release films 80 are then removed leaving cross-corrugated panel 10 shown in FIG. 1. Mandrels 70 and inserts 74 and the granular mixture may be reused in subsequent panel-making processes.

The invention has been described with reference to particularly preferred embodiments. It will be apparent to skilled artisans that various modifications can be made without departing from the spirit of the invention, and such modifications are intended to fall within the scope of the appended claims.

What is claimed is:

1. A cross-corrugated panel, comprising:

first and second faceplates positioned essentially parallel to and spaced apart from each other;

first and second pluralities of corrugated elements fixed between said first and second faceplates, the corrugated elements of each plurality having planar peaks and troughs positioned at regular intervals and connected by diagonally-extending segments, and being positioned parallel to and spaced apart from each other with the peaks and the troughs being 180 degrees out-of-phase with each other such that the peaks of one element are adjacent to the troughs of adjacent elements, said two pluralities of element being positioned perpendicular to each other, the elements of one plurality crossing the elements of the other plurality at their respective planar peaks and troughs, the diagonally-extending segments of said first plurality of elements comprising two flat strips whose flat surfaces are parallel to each other and perpendicular to said faceplates.

2. The cross-corrugated panel of claim 1, wherein there is an integral connection between said faceplates and said second plurality of corrugated elements, and between said second plurality of elements and said first plurality of elements.

3. The cross-corrugated panel of claim 1, wherein said first and second faceplates and said first and second pluralities of corrugated elements are composed of fiber-reinforced, resin-impregnated composite.

4. The cross-corrugated panel of claim 2, wherein said faceplates and said first and second pluralities of elements are composed of curable material, and said integral connections are formed by co-curing said faceplates and said first and second pluralities of elements.

5. A method of making a cross-corrugated panel, comprising the steps of:

providing first and second faceplates composed of curable material;

providing a first plurality of elements of curable material, each of the elements comprising two strips that are oppositely wound to define two elongated helixes having a rectangular cross-section and intersecting each other on the short sides of the rectangular cross-section;

arranging the elements in parallel relation to each other;

providing a second plurality of elements, each of the elements comprising a strip of curable material;

positioning the elements of the second plurality perpendicular to the elements of the first plurality, each element being positioned alternately over and under adjacent ones of the elements of the first plurality so that the elements of the second plurality contact the elements of the first plurality where the helixes thereof intersect, so that adjacent elements of the second plurality are 180 degrees out-of-phase with each other, the pluralities of elements forming a core;

placing the core between the faceplates to form an assembly; and heating and curing the assembly to form the cross-corrugated panel.

6. The method of claim 5, wherein said step of providing a first plurality of elements further comprises the step of providing a plurality of elongated rectangular mandrels around which the two strips are oppositely wound to define the elongated helixes.

7. The method of claim 6, wherein said step of positioning the elements of the second plurality further comprises the step of providing a plurality of groups of inserts and positioning a group between each of the rectangular mandrels to guide the elements of the second plurality therebetween.

8. The method of claim 7, wherein each of the groups of inserts comprises four inserts having triangular cross-sections and being arranged so that they form a rectangle in cross-section with the facing surfaces of adjacent ones of the four inserts forming oppositely directed and diagonally-extending openings through which the elements of the second plurality extend.

9. The method of claim 7, further comprising the step of removing the mandrels and the inserts before the assembly is heated and cured.

10. The method of claim 9, further comprising the step of filling the space occupied by the mandrels and the inserts with non-curable granules before the assembly is heated and cured.

11. A cross-corrugated panel made by the method of claim 5.

12. A cross-corrugated panel made by the method of claim 6.

* * * * *